United States Patent [19]
Pyle et al.

[11] Patent Number: 5,698,093
[45] Date of Patent: Dec. 16, 1997

[54] GASOLINE FILTER WITH AUTOMATIC SHUT OFF

[75] Inventors: James Pyle, Bridgeport; Geoffrey Wilcox, Roxbury, both of Conn.

[73] Assignee: Eagle Filter Corporation, BridgePort, Conn.

[21] Appl. No.: 656,475

[22] Filed: May 31, 1996

[51] Int. Cl.$^6$ ............................................ B01D 35/153
[52] U.S. Cl. ........................... 210/136; 210/234; 210/444; 210/453
[58] Field of Search ....................... 210/136, 234, 210/235, 248, 429, 430, 444, DIG. 17, 443, 450, 440, 453; 222/189.06; 137/549

[56] References Cited

U.S. PATENT DOCUMENTS

| | | |
|---|---|---|
| 3,388,801 | 6/1968 | Boyd et al. . |
| 3,608,726 | 9/1971 | Crowther . |
| 3,726,262 | 4/1973 | Moon ........................... 210/DIG. 17 |
| 4,222,875 | 9/1980 | Sikula, Jr. ........................... 210/235 |
| 4,512,884 | 4/1985 | Wheatley . |
| 4,617,116 | 10/1986 | Seiler . |
| 4,732,678 | 3/1988 | Humbert, Jr. . |
| 4,818,397 | 4/1989 | Joy ........................... 210/232 |
| 4,832,844 | 5/1989 | Ayers . |
| 4,834,885 | 5/1989 | Misgen et al. . |
| 4,872,976 | 10/1989 | Cudaback . |
| 4,959,141 | 9/1990 | Anderson . |
| 5,049,269 | 9/1991 | Shah . |
| 5,098,559 | 3/1992 | Mack et al. . |
| 5,132,009 | 7/1992 | Futa, Jr. et al. . |
| 5,182,015 | 1/1993 | Lee . |
| 5,250,176 | 10/1993 | Daniel . |
| 5,256,285 | 10/1993 | Tomita et al. . |
| 5,334,309 | 8/1994 | Huggett et al. . |
| 5,362,390 | 11/1994 | Widenhoefer et al. . |
| 5,390,701 | 2/1995 | Lessley et al. . |
| 5,405,527 | 4/1995 | Covington . |
| 5,447,627 | 9/1995 | Loafman et al. . |
| 5,548,893 | 8/1996 | Koelfgen ........................... 210/444 |

FOREIGN PATENT DOCUMENTS

| | | |
|---|---|---|
| 1446307 | 8/1976 | United Kingdom . |
| 2208068 | 2/1989 | United Kingdom ........................... 210/136 |

*Primary Examiner*—Matthew O. Savage
*Attorney, Agent, or Firm*—Jeffrey I. Kaplan, Esq.

[57] ABSTRACT

A fuel filter comprises of a adapter and a filter element within a can. The adapter provides a series of valves which are opened and closed by the attachment and detachment of the filter, thereby preventing spillage from the fuel pump when the filter is removed for replacement.

3 Claims, 5 Drawing Sheets

5,698,093

1

GASOLINE FILTER WITH AUTOMATIC SHUT OFF

TECHNICAL FIELD

This invention relates to fluid filters, and more particularly, to a filter preferably for use in a fuel dispenser, having a series of internal valves, the closing of which will prevent fuel spillage during filter removal and replacement.

BACKGROUND OF THE INVENTION

Nearly all machinery and pumps which utilize oil, gasoline, or similar fluids require filtering, in order to remove dirt and prevent machine wear. A common example of such devices is an automobile engine which contains an oil filter.

Typical filtering techniques involve a filter which includes an outer housing, termed a filter can, and an inner filtering element. Usually, these filters are screwed onto a series of pipes which provide one or more input and output channels for the fluid to enter and exit the filter respectively. Within the filter housing, a filter element is disposed between a set of one or more input ports and a set of one or more output ports so that fluid entering the filter housing is forced through the filter element before exiting through the output port to the output channel.

Gasoline service stations are one environment in which such filters are employed. The gasoline filter is typically disposed within the gasoline dispenser and must be changed periodically, typically every several months but highly dependent upon the volume of gasoline flowing through the dispenser and filter. When changing such gasoline filters however, often spillage occurs because excess gasoline in the meters, hoses and internal piping of the gasoline dispenser simply drains onto the ground. Additionally, even though the gasoline pump is turned off prior to changing the filter, the gasoline in the output pipe is under pressure, and thus immediately floods out as soon as the filter is loosened. Not only does this waste gasoline over the course of several filter changes, but perhaps more importantly, it presents an environmental hazard. While the amount of gasoline seems minimal, with so many thousands of service stations changing their filters on a regular basis, the amount of spillage can add up and become significant.

Several prior devices represent attempts to solve the above problem by controlling the flow of fluid out of the filter and/or piping during changing of the filter. U.S. Pat. No. 5,098,559 to Mack describes a system having a drain passage which opens when the filter is loosened so that all of the fluid flows out through the drain passageway, presumably into a suitable container. Once the fluid is emptied, the filter can be fully removed.

By directing the fluid out of a specific pipe, rather than having random spillage, the fluid can be collected in a suitable container. Such an arrangement minimizes or eliminates the amount of fluid leaking or spilling to the ground.

The Mack arrangement however, requires a complex set of valves and springs, shown at FIG. 1 thereof, which is highly subject to failure, difficult to manufacture, and results in tremendous expense. Perhaps most importantly, Mack provides no technique to stop the flow of fuel from the dispenser when the filter is removed. Accordingly, Mack has not even recognized the relevant problem.

Another patent describing a filter with a shut off valve mechanism is U.S. Pat. No. 5,049,269 to Shah. The Shah arrangement includes a valve located near the input port of

2 the filter so that if the filter becomes clogged and pressure accrues, the filter element will be bypassed rather than the entire filter bursting. Additionally, there is a valve at the output port which is opened by means of a shaft through the filter housing.

Once again however, the complex arrangement of valves requires numerous parts and is expensive. Additionally, installation of the shaft and the member 42 for holding the shaft increases cost and adds a point of failure for the filter. Finally, it is noted that the basic problem of spillage from the dispenser during changing the filter is simply not solved by the Shah arrangement because the supply pipes from the dispenser, which contain pressurized fluid, do not close when the filter is removed for replacement.

In view of the above, it can be appreciated that there exists a need in the art for a simplistic easy to manufacture filter which would prevent spillage during removal thereof.

SUMMARY OF THE INVENTION

The above and other problems of the prior art are overcome in accordance with the present invention which relates to a fluid filter preferably for use in a gasoline dispenser. In accordance with the invention, a set of valves are provided on the inputs and outputs of the filter. The input valves are biased to the normally closed position and are opened by the attachment of the filter media. The output valve is in a normally closed position and is opened by the pressure created from the flow of fuel. Accordingly, when the filter media is attached, the input valves open, thereby allowing a path for the gasoline to enter the filter and accumulate pressure. The fluid under pressure then causes the output valve to open and allows the fuel to exit the filter.

When the filter is detached, the input valves are closed via their associated springs, thereby preventing leakage. Any pressure previously accumulated in the filter is released as the can is loosened, and since the input valves also close as the can is loosened, no further fluid pressure accrues. Accordingly, the output valve closes, thereby preventing leakage from this additional source.

Preferably, only the internal filter media is replaced when dirty, not the entire filter canister. This results in less environmental waste as well as a more cost efficient system.

DETAILED DESCRIPTION OF THE PREFERRED EMBODIMENT

Figure 1:
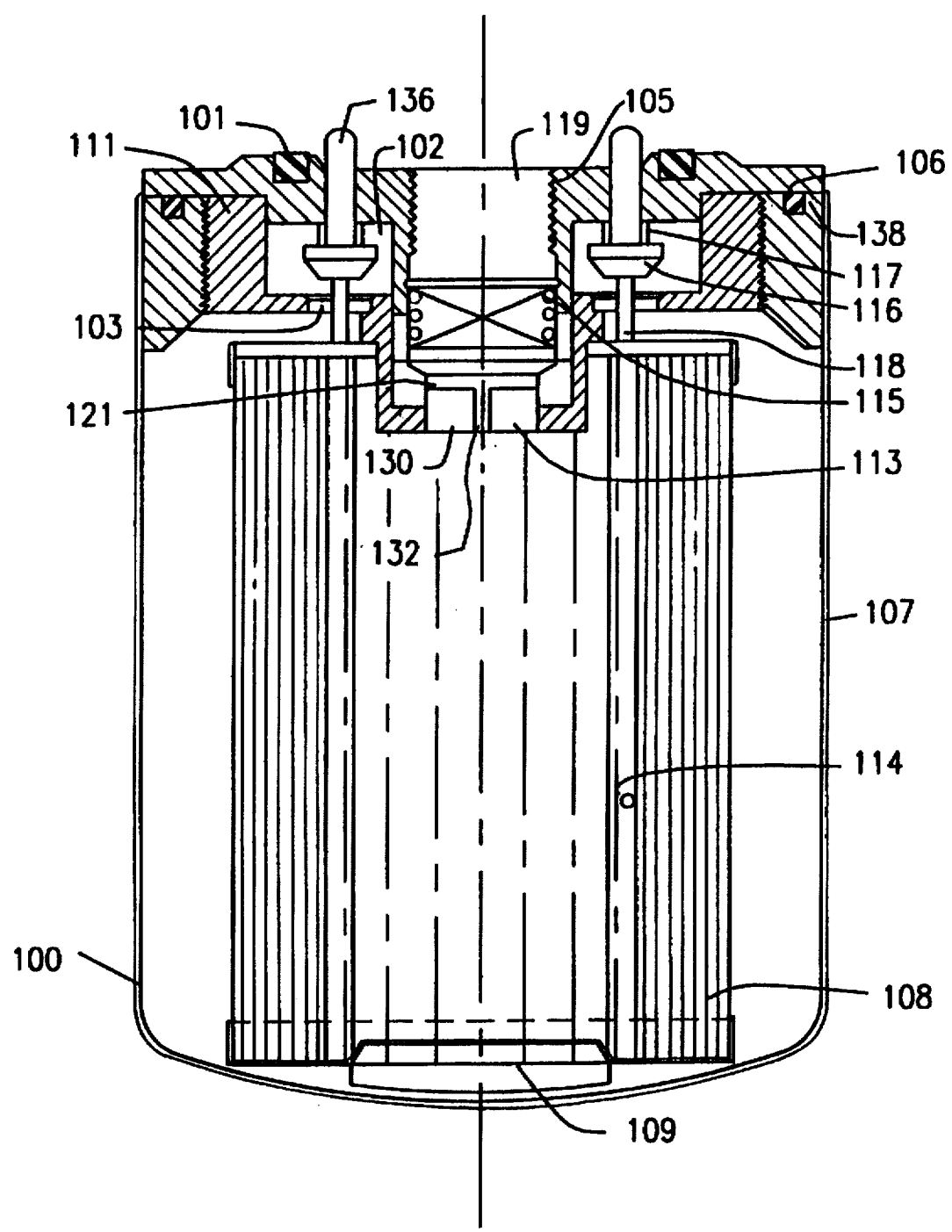
FIG. 1 shows a cross sectional cut away view of an exemplary embodiment of the present invention as installed on a gasoline dispenser.

FIG. 1 shows a side cross sectional view of the inventive filter 100 as installed on a gasoline pump. A filter canister screws onto an adapter 111 by means of threads 106. The adapter 111, which will be described in more detail later herein, screws over the output channel 119 of the dispenser, which dispenser is not shown for purposes of simplicity.

The filter includes an outer can 107 and an inner filtering element 108 which is designed for a particular fluid and particle size being filtered. Techniques for selecting appropriate filtering elements are well known to those of ordinary skill in the art. The filter also includes a spring element 109 for reasons which will be explained later herein.

In operation, adapter 111 is first screwed onto output channel 119 as shown in FIG. 1. The adapter includes all of the valves 116, as well as the central valve 121 and a set of threads 106 at the outer periphery thereof. As shown in FIG. 1, the filter canister 107 includes a mating set of threads so that the filter can may be screwed onto the adapter at 106.

Figure 5:
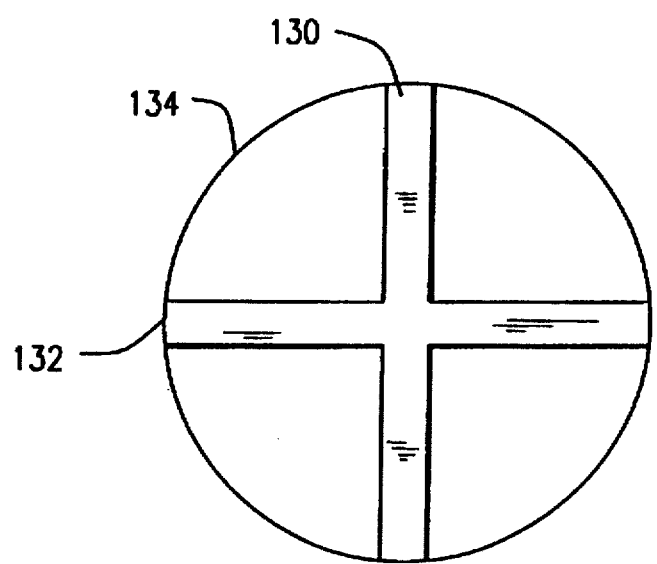
FIG. 5 shows a top view of a portion of FIG. 1.
Figure 6:
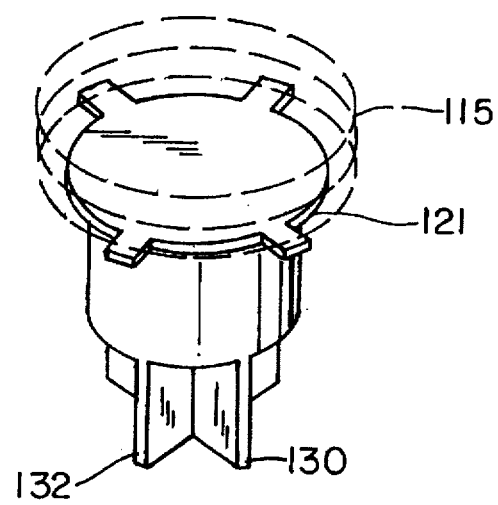
FIG. 6 is a specified portion of FIG. 5.

A portion of central valve 121 is shown in FIG. 5. The valve includes a base 134 and two perpendicular walls 130 and 132 as indicated. FIG. 6A shows a perspective view of one of walls 130 and 132.

The o-ring 101 serves to assist in achieving a tight seal between the adapter 111 and the dispenser (not shown). When the adapter is tightened onto output channel 119, o-ring 101 is compressed so that the remaining portion of the dispenser side surface of the adapter makes contact with the dispenser.

FIG. 1 depicts a filter in the installed and operational position. Gasoline to be filtered enters into a plurality of input ports. Although the input ports are not visible in FIG. 1, such ports are described later herein with reference to FIG. 2 and are indicated as 201 in FIG. 2. The fuel then fills chamber 102 and is forced out of passageway 103 into the filter can 107. Preferably, passageway 103 is the same diameter as the input ports so that the passageway presents substantially zero resistance to the flowing fuel. The resistance through chamber 102 and passageway 103 may not be absolutely zero, since shaft 118 effectively slightly diminishes the size of passageway 103.

As the fuel continues to be forced through passageway 103, it is pushed through the wall 114 of the filter element 108 and back out of output port 113. The output port 113 includes a central valve 121 which is spring loaded by a spring 115, the central valve 121 being forced open by the flowing fuel, typically under pressure of approximately 25 to 50 pounds per square inch.

After passing through output port 113, the fuel is returned to output channel 119 where it is fed back to the dispenser. Since the flowing fuel gives rise to a natural pressure tending to open output valve 121, no separate mechanism opening and closing this valve 121 is required.

We turn now to a description of the mechanism by which the fluid enters the filter 100. Valves 116 are in the normally closed position due to the biasing of springs 117 which tends to force the valves 116 to cover passageway 103. However, when the filter is installed as shown in FIG. 1, filter element 108 presses against shafts 118, forcing the valves 116 open and allowing the flow of fuel to be input to the filter as previously described.

It should be noted that while two valves 116 are shown in FIG. 1 for purposes of clarity, any number may be used. As will be described later, one preferred embodiment uses a set of six valves, and six corresponding input ports 201 and passageways 103.

When it is desired to change dirty filtering element 108, the gasoline pump is turned off and the filter can 107 is unscrewed. As the can is unscrewed, the force exerted by filter element 108 is removed, and valves 116 begin to close, fully closing well prior to the filter can being fully unscrewed. Thus, when the filter can is removed, valves 116 are closed.

Center valve 121 also closes when the filter can is removed due to the decrease in pressure from the flowing fuel. According, all of the passages leading to the dispenser are immediately sealed. Thus, spillage from the dispenser is eliminated.

Once the filter can 107 is fully unscrewed, the filter element 108 can be removed and replaced. The adapter 111 and filter can 107 can thus be installed and utilized with successive filter elements. Accordingly, not only is the cost minimized, but less waste is produced, resulting in environmental benefits.

The springs 117 are designed so that the filter element 108 can push on shafts 118 and open all of the valves. Spring 109 helps to assist in the process of opening valves 116 by assisting in forcing filter element 108 towards the valves. Accordingly, some of the force exerted by spring 109 is translated through shafts 118 in order to open valve 116.

Figure 2:
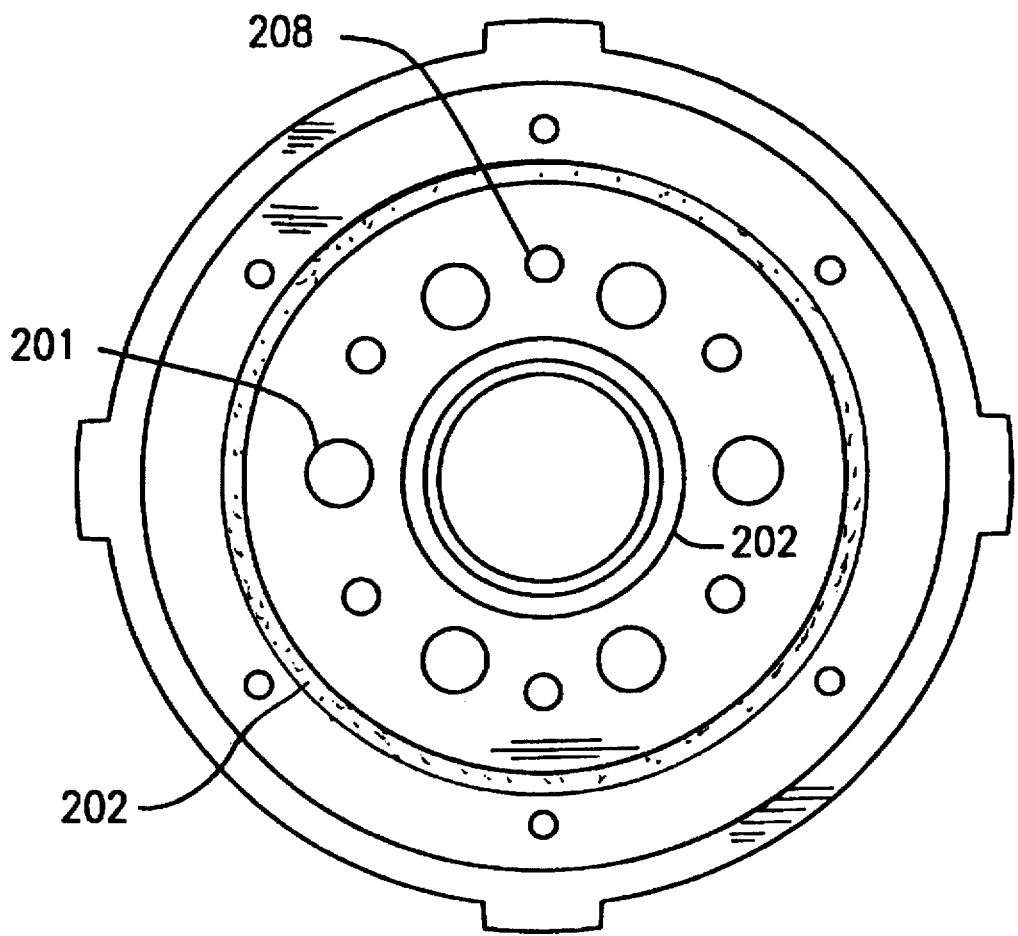
FIG. 2 shows a view, from the dispenser side, of an adapter utilized in one embodiment of the invention.

FIG. 2 shows a bottom view of the dispenser side of adapter 111. As can be seen from FIG. 2, the adapter contains 12 holes arranged in a circle. The holes alternate between large and small as shown. The small holes 208 are those through which shaft 136 of FIG. 1 fits, while the large holes 201 provide entry of fuel into chamber 102 of FIG. 1. Thus, it can be appreciated by comparing FIGS. 1 and 2 that when the filter can is unscrewed and valves 116 close, the fuel can enter through ports 201 of FIG. 2 but can not exit from chamber 102. Accordingly, the adapter 111 serves to prevent spillage.

Figure 4:
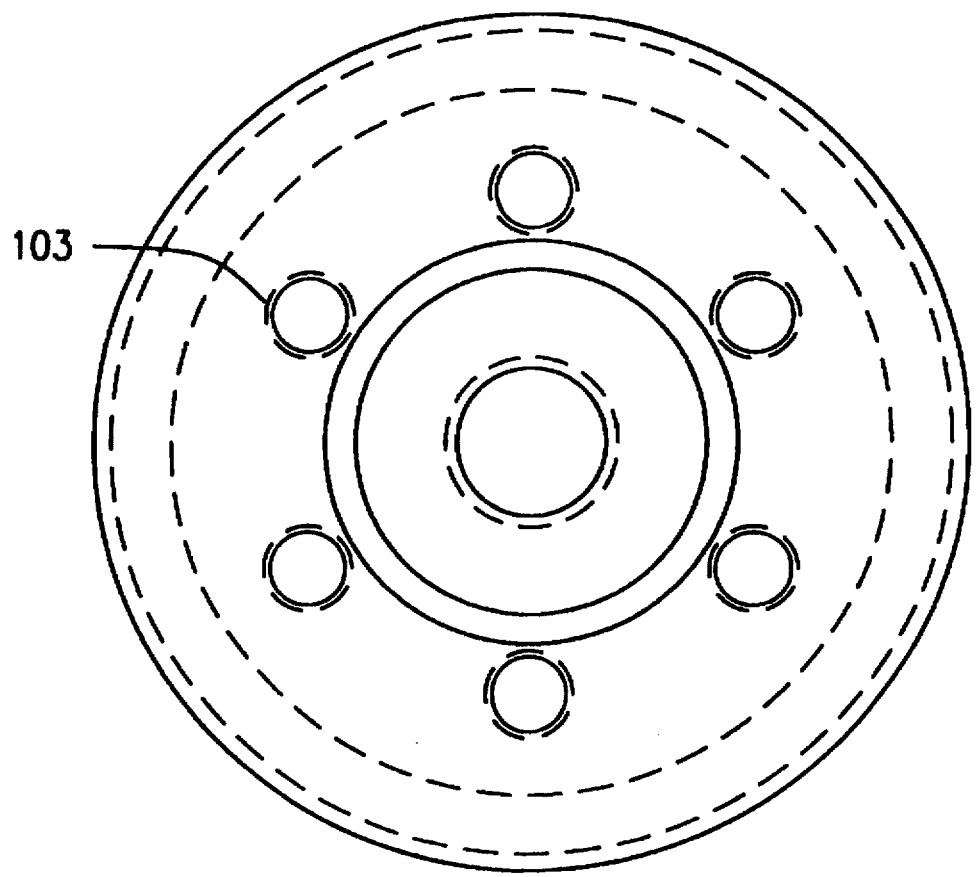
FIG. 4 shows a view of the adapter from the side of the adapter that gets connected to the filter.

FIG. 4 shows the filter side view of adapter 111, including 6 relatively large passageways 103. Through each of the passageways 103 would pass a shaft 118 as shown by FIG. 1. When the adapter 111 is assembled, passageways 103 are aligned with openings 208 so that the shafts 118 and 136 may protrude through two vertically aligned openings as shown in FIG. 1.

Thus, when the filter is installed, fuel enters chamber 102 for the most part by means of ports 201 and exits chamber 102 through passageway 103. The sizes of the ports 201 are selected to be relatively similar to that of the openings leading to passageways 103 so that the chamber presents a path of substantially zero resistance to the flowing fuel.

Figure 3:
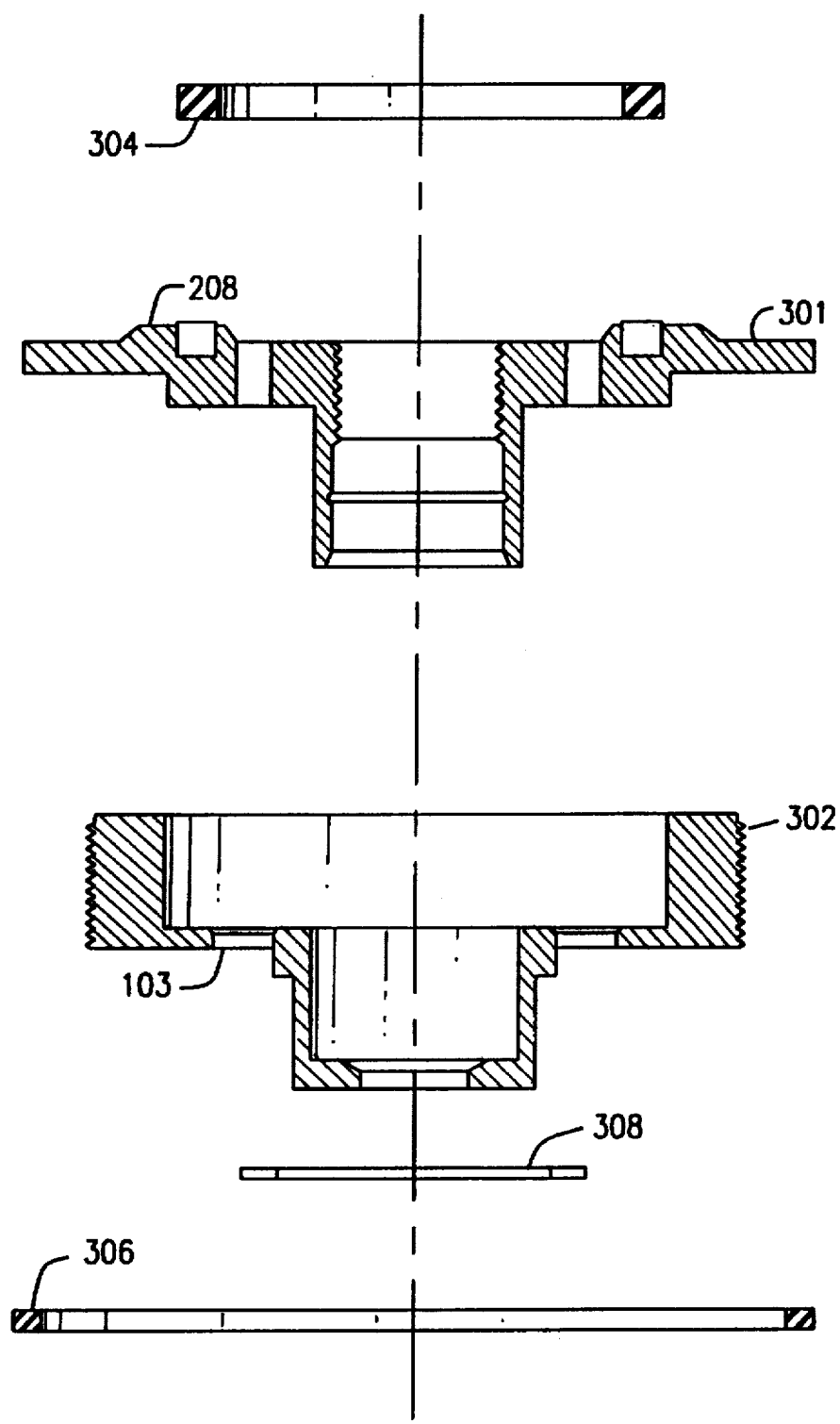
FIG. 3 shows various portions of the adapter prior to manufacture.

FIG. 3 shows several portions of adapter 111 prior to assembly thereof. The arrangement of FIG. 3 includes top and bottom elements 301 and 302, small and large o-rings 304 and 306 respectively, and a washer 308.

To assemble the adapter 111, the valves 116 are installed between upper and lower members 301 and 302, which are pressed together and then connected by any suitable technique. The o-rings are placed about the completed device as shown in FIGS. 1 through 3.

The present invention thus describes a system which is straightforward to manufacture, yet prevents leaking of the fluid from the dispenser during removal of the filter. Spillage from the filter can is avoided by holding the can in the proper orientation, and spillage from the dispenser is avoided in the manner described.

While the above describes the preferred embodiment of the invention, it will be apparent to those of ordinary skill in the art that various modifications and additions may be made without departing from the scope of the invention. Such modifications and additions are intended to be covered by the following claims.

We claim:

1. A filter apparatus for mounting to a dispenser, comprising:
    a housing including an open end having a threaded interior surface, a closed end, and a peripheral wall surrounding a central axis;

a tubular filter element surrounding said central axis and disposed within said housing, wherein said filter element includes an open end and a closed end, wherein said closed end is positioned proximate the closed end of said housing, wherein said open end of said filter element includes an outlet aperture and a peripheral engagement surface, said tubular filter element having an outer diameter that is smaller than an inner diameter of the open end of said housing whereby said filter element can be removed through the open end of said housing;

a base including a first and second opposed walls extending generally perpendicularly to said central axis, said second wall defining an exterior mounting surface for mounting to an exterior mounting surface of said dispenser, said base including a radially inner peripheral wall coaxially surrounding said central axis and rigidly joining said first and second opposed walls, said inner peripheral wall defining a central outlet aperture extending through said first and second opposed walls, said base having a radially outer peripheral wall surrounding said radially inner peripheral wall and rigidly joining said first and second opposed walls, said radially outer peripheral wall including a threaded exterior surface for threadedly engaging the threaded interior surface of said housing, wherein said radially outer peripheral wall and said radially inner peripheral wall define an annular cavity therebetween, wherein the first surface of said base includes means includes an annular projection defining an axially inner portion of said central outlet aperture, said annular projection being sealingly received within the outlet aperture of said filter element, wherein said central outlet aperture includes interior threads for threadedly mating with an exteriorly threaded inlet pipe of said dispenser, at least one first inlet aperture extending axially through said second wall to said cavity for connection to an outlet port of said dispenser, at least one additional aperture extending axially through said second wall to said cavity, at least one second inlet aperture extending axially through first wall to said cavity, wherein said at least one additional aperture is coaxially aligned with said at least one second inlet aperture;

a check valve disposed within the central outlet aperture of said base for permitting flow from the open end of said filter element while preventing flow into the open end of said filter element;

at least one inlet valve including a first shaft mounted in said at least one additional aperture and a second shaft extending through the at least one second inlet aperture for contact with the peripheral engagement surface of said filter element, said inlet valve including a valve member disposed in said cavity and interconnecting said first and second shafts, wherein said inlet valve is axially movable between open and closed positions whereby said valve member blocks said at least one second inlet aperture in said closed position and opens said at least one second inlet aperture in said open position, and spring means for biasing said valve member toward said closed position;

whereby the open end of said filter element maintains said inlet valve in the open position when the housing and filter element are connected to said base; and whereby said spring means maintains said inlet valve in the closed position when said housing and filter element have been removed from said base.

2. The filter apparatus of claim 1, further comprising a plurality of said first inlet apertures, a plurality of said additional apertures, a plurality of said second inlet apertures, and a plurality of said inlet valves.

3. The filter apparatus of claim 1, further comprising a spring disposed between the closed end of said housing and the closed end of said filter element for biasing the open end of said filter element toward said base.

* * * * *